O. F. TRIPP.

Knitting-Machines.

No. 6,177.

Reissued Dec. 15, 1874.

Witnesses:

C. E. Thomas.
J. C. Barber.

Inventor:

Othniel F. Tripp.

UNITED STATES PATENT OFFICE.

OTHNIEL F. TRIPP, OF BATTLE CREEK, MICHIGAN.

IMPROVEMENT IN KNITTING-MACHINES.

Specification forming part of Letters Patent No. 140,800, dated July 15, 1873; reissue No. 6,177, dated December 15, 1874; application filed September 4, 1874.

*To all whom it may concern:*

Be it known that I, OTHNIEL F. TRIPP, of Battle Creek, county of Calhoun and State of Michigan, have invented an Improvement in Knitting-Machines, of which the following is a specification:

The object of my invention is to provide a mechanical means whereby the projections or shanks at the lower ends of the needles are positively depressed in their grooves below the face of the bed-plate, or elevated above it, temporarily placing them in or out of position to engage with the actuating-cam without detaching the loops of the fabric from the hooks of the needles.

The improvement consists of the following devices: First, a needle-depressor, R; second, a lever needle-elevator, C; third, a bar, E, and transverse grooves or slots S, all constructed and operating substantially as hereinafter described, reference being had to the accompanying drawings forming a part of this specification, in which—

Figure 1:
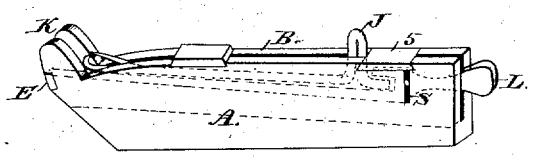
Figure 2:
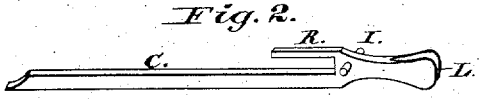
Figure 3:
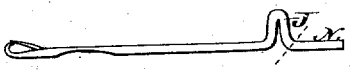

Figure 1 gives a sectional view of the needle bed-plate of a knitting-machine, showing one needle-groove and two needle-groove divisions; also, the lever and needle in dotted lines. Fig. 2 gives a view of the lever needle-elevator C and depressor R, as adapted to that class of knitting-machines having the needle N extended beyond the shank J, as shown in Fig. 3.

The needle-depressor R, Fig. 2, is a holder or bar, extended above and over the needle for the purpose of depressing its shank portion J below the face of the bed-plate, so as to render the needle temporarily inoperative without casting its stitch. The needle-elevator C, Fig. 2, is a supporter or bar operating upon the principle of a lever, in combination with the depressor R, and underlies the needle in the groove B of the bed-plate A, Fig. 1, the groove B being cut a sufficient width and depth to receive and allow the operation of both the needle and elevator, the upper end of which elevator is held in place at the jack-wires K by a bar, E, Fig. 1, and the lower end of the elevator projects from the needle-groove B, and is formed into a side spring or springs, L, shown in Fig. 2, and the said spring opens out or springs back upon a rest or shoulders at the lower end of the needle-groove B. The elevator thus supports the needle in full working position until the reverse is desired, which is instantly accomplished by pressing the spring sidewise and downward. The needle is again rendered operative by simply pushing up the elevator. The transverse grooves or slots S, Fig. 1, are cut across the needle-groove divisions of the bed-plate A, at a suitable point, and are of sufficient capacity to receive the elevator-stop I, or its equivalent, Fig. 2, and thereby retain or hold the depressor and elevator in working position; and the said elevator and depressor are further held from being lifted out of place by the register-plate in Fig. 1.

It is obvious that this improvement adds greatly to the utility of knitting-machines, because by this means any one or more of the needles may be instantly rendered temporarily operative or inoperative without casting their stitches, thus enabling the operator to rapidly form a gore or wedge in any part of a flat or tubular web, turn the heel of a stocking, or form a glove with fingers complete, and also facilitate the production of double-knit or overshot work, such as the striped mitten, as well as a great variety of fancy-knit fabrics, heretofore wrought chiefly by hand.

I claim as my invention—

1. A knitting-machine-needle depressor, consisting of a holder or bar, with its upper portion extended above and over the needle, for the purpose of depressing the needle-shank below the face of the bed-plate, whereby the needle is rendered temporarily inoperative without casting its stitch, as set forth.

2. A knitting-machine-needle elevator, consisting of a supporter or bar underlying the needle, and operating upon the principle of a lever, in combination with the needle-depressor, substantially as and for the purpose set forth.

OTHNIEL F. TRIPP.

In presence of—
C. E. THOMAS,
J. C. BARBER.